US012728889B2

(12) United States Patent
Stefansson et al.

(10) Patent No.: US 12,728,889 B2
(45) Date of Patent: Sep. 8, 2026

(54) METHOD AND DEVICE FOR DETERMINING FREE-SPACE

(71) Applicant: ZENSEACT AB, Gothenburg (SE)

(72) Inventors: Thor Stefansson, Gothenburg (SE); Mathias Ernst, Gothenburg (SE); Staffan Nilsson, Gothenburg (SE); Ömer Faruk Adil, Vårgårda (SE)

(73) Assignee: ZENSEACT AB, Gothenburg (SE)

( * ) Notice: Subject to any disclaimer, the term of this patent is extended or adjusted under 35 U.S.C. 154(b) by 147 days.

(21) Appl. No.: 18/672,499

(22) Filed: May 23, 2024

(65) Prior Publication Data

US 2024/0391493 A1 Nov. 28, 2024

(30) Foreign Application Priority Data

May 24, 2023 (EP) .................................... 23175121

(51) Int. Cl.
*B60W 60/00* (2020.01)
*G06T 7/11* (2017.01)

(52) U.S. Cl.
CPC ............ *B60W 60/001* (2020.02); *G06T 7/11* (2017.01); *G06T 2207/10028* (2013.01); *G06T 2207/30252* (2013.01)

(58) Field of Classification Search
None
See application file for complete search history.

(56) References Cited

U.S. PATENT DOCUMENTS 10,088,317 B2 * 10/2018 Chrysanthakopoulos .................. G01C 21/005
10,657,391 B2 * 5/2020 Chen .................... G06V 20/588
(Continued)

FOREIGN PATENT DOCUMENTS

DE 102017216442 A1 * 3/2019 ......... B62D 15/0285
EP 4067930 A1 * 10/2022 ............ G06F 18/00
(Continued)

OTHER PUBLICATIONS

C. Lu, M. J. G. van de Molengraft and G. Dubbelman, “Monocular Semantic Occupancy Grid Mapping With Convolutional Variational Encoder-Decoder Networks,” in IEEE Robotics and Automation Letters, vol. 4, No. 2, pp. 445-452, Apr. 2019 (Year: 2019).*
(Continued)

*Primary Examiner* — Mahmoud S Ismail
*Assistant Examiner* — Jacob Daniel Underbakke
(74) *Attorney, Agent, or Firm* — Sage Patent Group

(57) ABSTRACT

A method for determining free-space in a surrounding environment of a vehicle equipped with an automated driving system, ADS. The method includes: obtaining an image depicting the surrounding environment of the vehicle; determining: for each reference point of a plurality of reference points in the image, segmentation data indicative of a confidence score of the reference point belonging to free-space and depth data indicative of a distance of each reference point relative the camera; assigning each reference point of the plurality of reference points to a cell of a plurality of cells in a grid, based on the depth data associated with each reference point of the plurality of reference points; and assigning an aggregated confidence score, based on the segmentation data associated with each reference point of the respective cell, thereby determining a free-space in the surrounding environment of the vehicle.

12 Claims, 6 Drawing Sheets

(56) References Cited

U.S. PATENT DOCUMENTS

| | | | | |
|---|---|---|---|---|
| 10,921,817 | B1 * | 2/2021 | Kangaspunta | G06V 20/56 |
| 2016/0157414 | A1 * | 6/2016 | Ackerman | G01S 5/16 701/25 |
| 2018/0281680 | A1 * | 10/2018 | Gerardo Castro | B60W 50/14 |
| 2019/0228237 | A1 * | 7/2019 | Chavali | B60W 30/00 |
| 2019/0265046 | A1 * | 8/2019 | Agarwal | G01S 7/4808 |
| 2019/0286153 | A1 * | 9/2019 | Rankawat | G05D 1/227 |
| 2020/0225622 | A1 * | 7/2020 | Buerkle | G01S 15/04 |
| 2021/0063578 | A1 * | 3/2021 | Wekel | G01S 17/894 |
| 2021/0131823 | A1 * | 5/2021 | Giorgio | G06V 10/803 |
| 2021/0276591 | A1 * | 9/2021 | Urtasun | G01S 13/865 |
| 2022/0019893 | A1 * | 1/2022 | Kwon | G06N 3/08 |
| 2022/0068017 | A1 * | 3/2022 | Lee | G06T 7/593 |
| 2022/0105955 | A1 * | 4/2022 | Shridhar | G08G 1/166 |
| 2022/0129708 | A1 * | 4/2022 | Gamzo | G06N 3/045 |
| 2022/0230016 | A1 * | 7/2022 | Ahamed | G06F 18/2113 |
| 2023/0008457 | A1 * | 1/2023 | Porebski | G06F 18/217 |
| 2023/0294727 | A1 * | 9/2023 | Oh | G06F 18/25 701/23 |
| 2024/0317260 | A1 * | 9/2024 | Donderici | B60W 60/0015 |
| 2024/0319338 | A1 * | 9/2024 | Kim | G01S 17/931 |

FOREIGN PATENT DOCUMENTS

| | | | | |
|---|---|---|---|---|
| KR | 20170126740 A | * 11/2017 | | G01S 17/89 |
| KR | 20210062672 A | * 5/2021 | | B60W 40/08 |

OTHER PUBLICATIONS

C. O'Meadhra, W. Tabib and N. Michael, "Variable Resolution Occupancy Mapping Using Gaussian Mixture Models," in IEEE Robotics and Automation Letters, vol. 4, No. 2, pp. 2015-2022, Apr. 2019, (Year: 2019).*

E. Einhorn, C. Schröter and H.-M. Gross, "Finding the adequate resolution for grid mapping—Cell sizes locally adapting on-the-fly," 2011 IEEE International Conference on Robotics and Automation, Shanghai, China, 2011, pp. 1843-1848 (Year: 2011).*

Defauw N, Malfante M, Antoni O, Rakotovao T, Lesecq S. Vehicle Detection on Occupancy Grid Maps: Comparison of Five Detectors Regarding Real-Time Performance. Sensors (Basel). 2023;23(3):1613. Published Feb. 2, 2023. doi:10.3390/s23031613 ( Year: 2023).*

V. Jiménez, J. Godoy, A. Artuñedo and J. Villagra, "Object-Level Semantic and Velocity Feedback for Dynamic Occupancy Grids," in IEEE Transactions on Intelligent Vehicles, vol. 8, No. 7, pp. 3936-3953, Jul. 2023 (Year: 2023).*

R. Danescu, F. Oniga and S. Nedevschi, "Modeling and Tracking the Driving Environment With a Particle-Based Occupancy Grid," in IEEE Transactions on Intelligent Transportation Systems, vol. 12, No. 4, pp. 1331-1342, Dec. 2011 (Year: 2011).*

Lu, Chenyang et al.; "Monocular Semantic Occupancy Grid Mapping With Convolutional Variational Encoder-Decoder Networks"; IEEE Robotics and Automation Letters, vol. 4, No. 2; Apr. 1, 2019; pp. 445-452, XP011705741, 8 pages.

Einhorn, Erik et al.; "Finding the adequate resolution for grid mapping—Cell sizes locally adapting on-the-fly"; 2011 IEEE International Conference on Robotics and Automation (ICRA); May 9, 2011; pp. 1843-1848; XP032033907; 6 pages.

Erkent, Ozgur et al.; "Semantic Grid Estimation with a Hybrid Bayesian and Deep Neural Network Approach"; 2018 IEEE/RSJ International Conference on Intelligent Robots and Systems (IROS); Oct. 1, 2018; pp. 888-895, XP033490778, 8 pages.

Patra, Suvam et al.; "A Joint 3D-2D based Method for Free Space Detection on Roads"; 2018 IEEE Winter Conference on Applications of Computer Vision (WACV); Mar. 2018; 10 pages.

Palafox, Pablo et al.; "SemanticDepth: Fusing Semantic Segmentation and Monocular Depth Estimation for Enabling Autonomous Driving in Roads without Lane Lines"; Sensors 2019 (19) 3224; Jun. 12, 2019; 20 pages.

Extended European Search Report mailed Sep. 21, 2023 for European Patent Application No. 23175121.5, 8 pages.

* cited by examiner

METHOD AND DEVICE FOR DETERMINING FREE-SPACE

CROSS-REFERENCE TO RELATED APPLICATIONS

The present application for patent claims priority to European Patent Office Application Ser. No. 23175121.5, entitled "A METHOD AND DEVICE FOR DETERMINING FREE-SPACE", filed on May 24, 2023, assigned to the assignee hereof, and expressly incorporated herein by reference.

TECHNICAL FIELD

The present inventive concept relates to the field of autonomous driving. In particular, it is related to methods and devices for determining free-space in a surrounding environment of a vehicle.

BACKGROUND

With the development of technology in recent years, image capturing and processing techniques have become widely used in different fields of technology. In particular, vehicles produced today are commonly equipped with some form of vision or perception system for enabling new functionalities.

An increasing portion of modern vehicles have advanced driver-assistance systems (ADAS) to increase vehicle safety and more generally road safety. ADAS-which for instance may be represented by adaptive cruise control (ACC), collision avoidance system, forward collision warning, lane support systems, etc.—are electronic systems that may aid a vehicle driver while driving. Today, there is ongoing research and development within a number of technical areas associated to both the ADAS and the Autonomous Driving (AD) field. ADAS and AD may also be referred to under the common term Automated Driving System (ADS) corresponding to all of the different levels of automation as for example defined by the SAE J3016 levels (0-5) of driving automation.

One of the most critical challenges facing autonomous or semiautonomous vehicles (i.e., ADS enabled vehicles) is the ability to accurately detect and navigate through their surrounding environments. To achieve this, the vehicle needs to be able to detect and assess the free-space around it, which is the driveable area of the environment that is not occupied by any obstacles.

Conventional methods of free-space estimation or determination rely on the use of different sensors of the vehicle to determine free-space in a three-dimensional representation of the world. One existing approach is to generate a depth image of the surrounding environment and from that determine the free-space from what appears to belong to the flat surface that is the ground. However, this approach has disadvantages such as being susceptible to noise in areas that are generally flat. Another existing approach is to perform a pixel-by-pixel semantic segmentation, which classifies each pixel as either road or non-road. From that, the free-space can be determined as everything that belongs to the road. However, this approach has drawbacks of e.g. not being able to accurately handle non-flat objects, such as objects sticking out of the back of a vehicle. There is therefore need for improved solutions for free-space estimation.

SUMMARY

The herein disclosed technology seeks to mitigate, alleviate or eliminate one or more of the above-identified deficiencies and disadvantages in the prior art to address various problems relating to free-space estimation within the field of autonomous or semi-autonomous driving.

The present invention provides a new and improved way of performing free-space estimation. The present inventive concept combines depth information with semantic segmentation information of an image of the surrounding environment, and estimates the free-space on a grid of an estimated ground plane of the surrounding environment in 3D. By the present inventive concept, the estimated free-space can be determined with improved accuracy and robustness, which in turn improves the capability and safety of the vehicle.

Various aspects and embodiments of the disclosed invention are defined below and in the accompanying independent and dependent claims.

According to a first aspect of the presently disclosed technology, there is provided a computer-implemented method for determining free-space in a surrounding environment of a vehicle equipped with an automated driving system, ADS. The method comprises obtaining, from a camera of the vehicle, an image depicting the surrounding environment of the vehicle. The method further comprises determining, for each reference point of a plurality of reference points in the image, segmentation data indicative of a confidence score of the reference point belonging to free-space. The method further comprises determining, for each reference point of the plurality of reference points, depth data indicative of a distance of each reference point relative the camera. The method further comprises assigning each reference point of the plurality of reference points to a cell of a plurality of cells in a grid, based on the depth data associated with each reference point of the plurality of reference points. The grid corresponds to an estimated ground plane of the surrounding environment. The method further comprises assigning, to each cell of the grid, an aggregated confidence score, based on the segmentation data associated with each reference point of the respective cell, thereby determining a free-space in the surrounding environment of the vehicle as the cells having aggregated confidence scores indicative of belonging to free-space.

As stated above, the presently disclosed technology provides for improvements to the free-estimation e.g. in terms of resolution and accuracy, i.e., that the free-space can be determined with a higher precision. More specifically, a possible associated advantage is that it can handle protruding objects (e.g., a cargo sticking out of a vehicle in front of the ego-vehicle) in a better way. This may partly be because of combining both depth data and segmentation data of the objects in the image mitigates the problem of classifying everything that looks as road as non-occupied road, even those parts of the road that for instance are present beneath an obstacle but still visible to a camera of the vehicle.

The present method may further improve robustness of the free-space estimation. Firstly, in terms of handling outliers or erroneous classified reference points (i.e., noise), since the aggregated confidence score weighs in the classification of all reference points within each cell. Secondly, in terms of handling cells where the individual confidence scores of the reference points are a bit uncertain. By the aggregated confidence score, a more certain or confidence estimation may be achieved.

Furthermore, the two step approach of assessing the free-space both on reference point-level and on cell-level may be advantageous in that it facilitates using relatively simple classification algorithms on reference point-level, while still obtaining a relatively high confidence estimation of free-space on cell-level. This may reduce the computational resources required to perform the method, as well as allowing it to be run constantly in real-time, on new images captured by the camera of the vehicle.

According to a second aspect, there is provided a computer program product comprising instructions, which, when the program is executed by a computing device, causes the computing device to carry out the method according to any embodiment of the first aspect. According to an alternative embodiment of the second aspect, there is provided a (non-transitory) computer-readable storage medium. The non-transitory computer-readable storage medium stores one or more programs configured to be executed by one or more processors of a processing system, the one or more programs comprising instructions for performing the method according to any embodiment of the first aspect. The above-mentioned features of the first aspect, when applicable, apply to this second aspect as well. In order to avoid undue repetition, reference is made to the above.

According to a third aspect, there is provided a device for determining free-space in a surrounding environment of a vehicle equipped with an automated driving system, ADS. The device comprises control circuitry. The control circuitry is configured to obtain, from a camera of the vehicle, an image depicting the surrounding environment of the vehicle. The control circuitry is further configured to determine, for each reference point of a plurality of reference points in the image, segmentation data indicative of a confidence score of the reference point belonging to free-space. The control circuitry is further configured to determine, for each reference point of the plurality of reference points, depth data indicative of a distance of each reference point relative the camera. The control circuitry is further configured to assign each reference point of the plurality of reference points to a cell of a plurality of cells in a grid, based on the depth data associated with each reference point of the plurality of reference points. The grid corresponds to an estimated ground plane of the surrounding environment. The control circuitry is further configured to assign, to each cell of the grid, an aggregated confidence score, based on the segmentation data associated with each reference point of the respective cell, thereby determining a free-space in the surrounding environment of the vehicle as the cells having aggregated confidence scores indicative of belonging to free-space. The above-mentioned features of the first and second aspect, when applicable, apply to this third aspect as well. In order to avoid undue repetition, reference is made to the above.

According to a fourth aspect, there is provided a vehicle. The vehicle comprises at least one camera. The vehicle further comprises a device for determining free-space in a surrounding environment of the vehicle, according to any embodiment of the third aspect. The above-mentioned features of the first, second, and third aspects, when applicable, apply to this fourth aspect as well. In order to avoid undue repetition, reference is made to the above.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which May be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will, in the following, be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first element could be termed a second element, and, similarly, a second element could be termed a first element, without departing from the scope of the embodiments. The first element and the second element are both elements, but they are not the same element.

Figure 1:
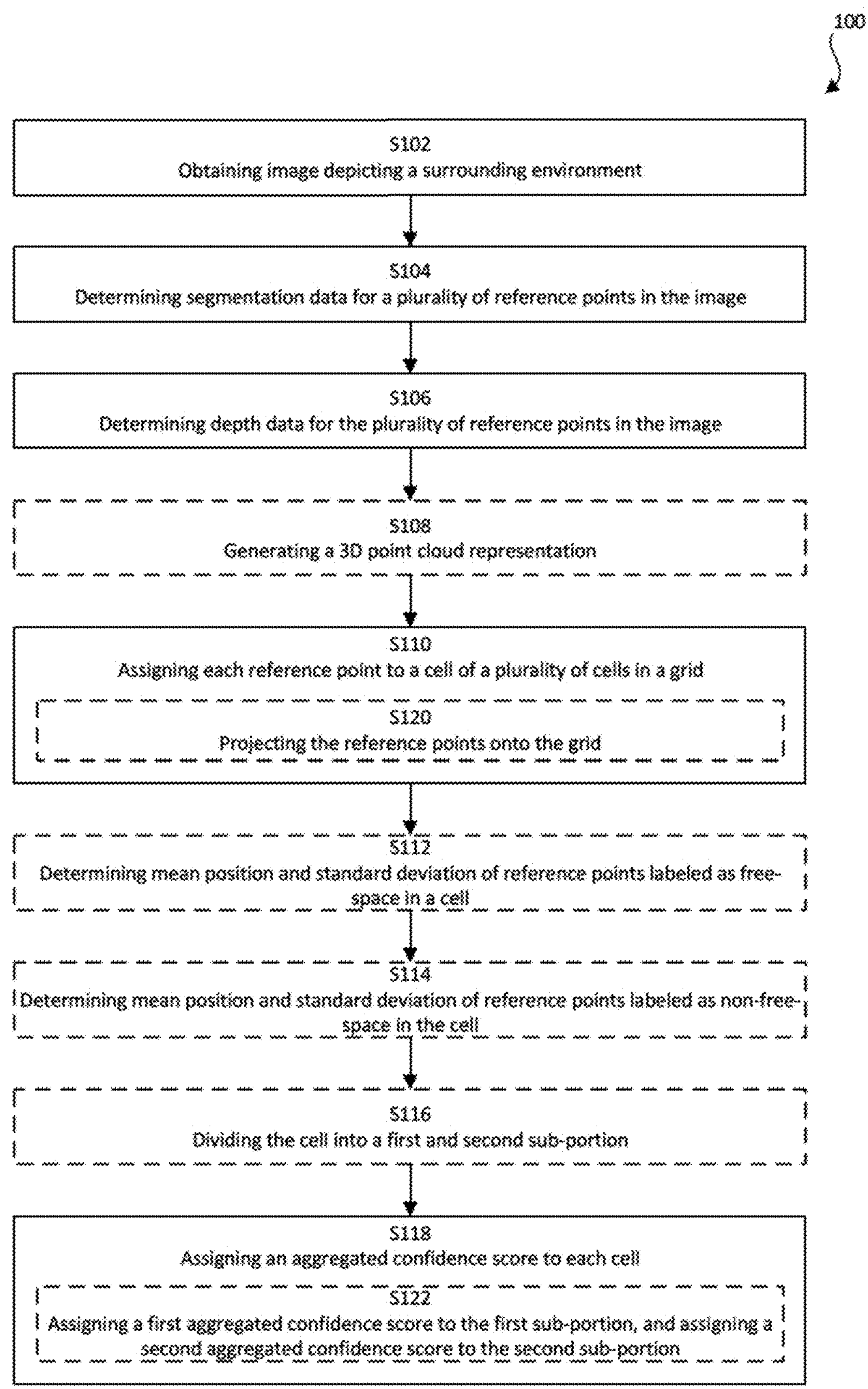
FIG. 1 is a schematic flowchart representation of a method for determining free-space in a surrounding environment of a vehicle equipped with an automated driving system in accordance with some embodiments.

FIG. 1 is a schematic flowchart representation of a method 100 for determining free-space in a surrounding environment of a vehicle. The vehicle is equipped with an automated driving system, ADS. Below, the different steps are described in more detail. Even though illustrated in a specific order, the steps of the method 100 may be performed in any suitable order as well as multiple times. Thus, although FIG. 1 shows a specific order of method steps, the order of the steps may differ from what is depicted. In addition, two or more steps may be performed concurrently or with partial concurrence. For example, the steps denoted S104 and S106 can be performed independently of each other, and in any order, based on a specific realization. The same holds also for the steps denoted S112 and S114. Such variation will depend on the software and hardware systems chosen and on designer choice. All such variations are within the scope of the invention. Likewise, software implementations could be accomplished with standard programming techniques with rule-based logic and other logic to accomplish the various steps. The above mentioned and described embodiments are only given as examples and should not be limiting to the present invention. Other solutions, uses, objectives, and functions within the scope of the invention as claimed in the below described patent claims should be apparent for the person skilled in the art.

The method 100 comprises obtaining S102 an image depicting the surrounding environment from a camera of the vehicle. Put differently, the method 100 may comprise obtaining S102 an image depicting the surrounding environment of the vehicle, the image being captured by a camera of the vehicle.

The term "obtaining" is herein to be interpreted broadly and encompasses receiving, retrieving, collecting, acquiring, and so forth directly and/or indirectly between two entities configured to be in communication with each other or further with other external entities. However, in some embodiments, the term "obtaining" is to be construed as determining, deriving, forming, computing, etc. Thus, obtaining S102 the image from the camera may comprise receiving the image from the camera, or from a memory where the image has been stored. Obtaining S102 the image may comprise capturing the image by transmitting instructions to the camera to capture the image.

The surrounding environment of a vehicle is to be understood as a general area around the vehicle in which objects (such as other vehicles, landmarks, obstacles, etc.) can be detected and identified by vehicle sensors (RADAR, LIDAR, cameras, etc.), i.e., within a sensor range of the vehicle.

The method 100 further comprises determining S104, for each reference point of a plurality of reference points in the image, segmentation data indicative of a confidence score of the reference point belonging to free-space.

The wording "reference point" is herein to be construed as a sub-portion of the image of which the segmentation data is determined. The reference point may be a pixel of the image. In other words, the plurality of reference points may correspond to a plurality of pixels of the image. The plurality of pixels may constitute all of the pixels in the image. Alternatively, the plurality of pixels may correspond to a subset of pixels of the image. The segmentation data may thus be determined on a pixel-level, i.e., for every pixel in the image. In some embodiments, the reference point may be a group of pixels. In other words, each reference point of the plurality of reference points may correspond to a respective group of neighbouring pixels. Thus, the segmentation data may be determined on a pixel group-level.

It should be further noted that the plurality of reference points need not to cover the entire image. Thus, the segmentation data need not to be determined for every pixel of the image. The plurality of reference points may for instance correspond only to a portion of the image, and thus the segmentation data is determined for that portion of the image. The portion of the image may for instance be a cropped out portion of the image of high relevance. Thus, portions of less relevance may be filtered away, such that only a portion of the image mainly depicting a road is used. The portion of the image selected for further processing by the method 100 may be selected, e.g., as a pre-determined portion of the image. Since the camera is typically fixedly mounted to the vehicle, an expected position of the road within the field of view of the camera can be determined by knowing the position and orientation of the camera in relation to the vehicle, and can be expected to be generally the same in a majority of possible driving scenarios. Other portions of the image such as the sky, or surrounding buildings may thus be disregarded when determining the free-space since they cannot form part of a drivable space. Alternatively, or additionally, a separate image segmentation step may be performed to identify such portions of the image that can be disregarded. Another way of removing less relevant parts is to remove or disregard reference points corresponding to a position above or below a certain height from the ground plane. Further, any points falling outside a grid (further explained below) may also be removed/disregarded from further processing by the method 100. The grid may thus be seen as an area of interest around the vehicle.

The segmentation data is, as stated above, indicative of a confidence score of the reference point belonging to free-space. The segmentation data may comprise the confidence score. The confidence score may be a binary label, e.g. it can be either free-space or non-free-space. In another example, the confidence score may be a continuous probability score or continuous value of the reference point (or the part of the image corresponding to the reference point) belonging to or being free-space. A reference point may then be classified as belonging to free-space if the confidence score is above a certain threshold.

"Free-space" should throughout the present disclosure be understood as parts of a road (i.e., road-like areas) that are not occupied with any other object, and thus is "free". In other words, free-space refers to an area around the vehicle that is free of obstacles, such as other vehicles, pedestrians, buildings etc. Thus, free-space may be seen as parts of a road (e.g., the lane of the vehicle, or a neighbouring lane in the same direction of travel) that are not occupied with any other object, and on which the vehicle is allowed (e.g. in view of safety requirements, or traffic rules) to drive. This may also be referred to as "drivable free-space". Put differently, "free-space" may in some embodiments be interpreted as "drivable free-space".

In some contexts, "non-drivable free-space" may be used to refer to parts of a road that is free, but on which the vehicle is not allowed to drive. Some examples of non-drivable free-space include an oncoming lane, a bike lane, a closed lane, a gravel shoulder of a road, and a grass shoulder of a road. Thus, free-space may, in some embodiments, comprise of both drivable free-space and non-drivable free-space. When, in some embodiments where "free-space" is used to refer to what above is described as "drivable free-space", what above is described as "non-drivable free-space" may be treated as "non-free-space". In other words, the non-drivable free-space may be part of the non-free-space.

Dividing an estimated "free-space" into "drivable free-space" and "non-drivable free-space" can be done by some further steps, such as utilizing map data or analysing images or other types of sensor data to determine what traffic rules apply in the situation, or what kind of area it is (i.e., if it's a lane, a shoulder of the road, a refuge island, etc.). For example, image analysis techniques may be used to determine what is a road, and what is a non-drivable area next to the road. Such steps may be part of some embodiments, as will be explained further below.

The step of determining S104 the segmentation data may be seen as performing a semantic segmentation of the image, i.e., determining for each pixel (or a sub-set of pixels) whether they depict free-space not. In other words, the step of determining S104 the segmentation data may be interpreted as classifying the reference point as either belonging to free-space or non-free-space. In some embodiments, the confidence score may be determined based on whether the reference point depicts a road or not. Put differently, free-space may, at this stage, be determined as any area corresponding to a road, and non-free-space may be determined as any area not corresponding to road. In a later stage of determining whether a cell of a grid belongs to free-space or not (as will be further described below), the free-space may be determined as any road that is also non-occupied of any other object. It should be appreciated that determining a reference point as belonging to free-space or not may take into account further data, or involve further steps than just checking whether the reference point depicts a road or not, as explained in the example above.

The step of determining S104 the segmentation data may be performed by inputting the image to a machine learning model trained to semantically segment images. The machine-learning models (may also be referred to as machine-learning algorithms, neural networks, and so forth) as described herein may in some embodiments be implemented using publicly available suitable software development machine learning code elements, for example, such as those which are available in Python®, Keras® and TensorFlow® or in any other suitable software development platform, in any manner known to be suitable to someone of ordinary skill in the art.

The method 100 further comprises determining S106, for each reference point of the plurality of reference points, depth data indicative of a distance of each reference point relative the camera. In other words, a depth estimation is performed for each reference point.

The depth data, as stated above, is inactive of a distance between the camera used to capture the image and an object depicted in the respective reference points. Determining the depth data can be done using any conventional techniques, such as stereo vision utilizing a stereo camera setup, LIDAR, RADAR, computer vision algorithms or neural networks. For example, the step of determining S106 the depth data may be performed by inputting the image to a machine learning model trained to determine a depth estimate of objects depicted in images. The machine learning model may be trained using images, optionally in combination with LIDAR data.

The method 100 further comprises assigning S110 each reference point of the plurality of reference points to a cell 406 of a plurality of cells in a grid 408, based on the depth data associated with each reference point of the plurality of reference points. Put differently, the reference points may be arranged or sorted into the cells of the grid, based on the depth data associated with the respective reference points. The grid 408 corresponds to an estimated ground plane of the surrounding environment. Put differently, the grid is aligned with the estimated ground plane of the surrounding environment. The grid will be further explained below in connection with FIGS. 4 to 6.

Prior to assigning S110 the reference points to the plurality of cells in the grid, the method 100 may further comprise generating S108 a 3D point cloud representation by backward projection of each reference point of the plurality of reference points based on the associated depth data. The 3D point cloud representation of the image thus comprises the plurality of reference points in 3D, with each reference point being associated with its segmentation data. The backward projection of the reference points may be done by conventional techniques known to the person skilled in the art. Such techniques may commonly require knowing a camera model of the camera used to capture the image. The camera model comprises the intrinsic parameters of the camera. Assigning S110 each reference point of the plurality of reference points to a cell (as will be further explained in the following) may then comprise projecting S120 the reference points of the 3D point cloud representation onto the grid. By projecting, it is herein meant translating the reference points onto the grid along a direction perpendicular to the ground plane.

When generating S108 the 3D point cloud, surfaces that are facing the camera having captured the image (e.g., the back of a vehicle) may naturally generate more reference points in the 3D point cloud than the road which is flat and extending generally along the depth direction. Thus, when projecting the 3D points onto the grid, the surface facing the camera may generate a higher density of reference points in the cells located where the object is (i.e., reference points classified as non-free-space), compared to a cell located at an unoccupied part of the road (i.e., free-space). An effect of this may be that the free-space estimate (or rather the estimate of where the road is occupied) can be determined with a high confidence around the objects, due to the high density of reference points at these areas.

Moving on, the method 100 further comprises assigning S118, to each cell of the grid, an aggregated confidence score, based on the segmentation data associated with each reference point of the respective cell. In other words, the aggregated confidence score of a cell is formed by combining the confidence scores of the reference points having been assigned to that cell. The aggregated confidence score may thus be seen as a confidence score of the cell belonging to free-space of not. Thereby a free-space is determined in the surrounding environment of the vehicle as the cells having aggregated confidence scores indicative of belonging to free-space. Put differently, the cells which have an aggregated confidence score that is indicative of the cell belonging to free-space, may constitute the determined free-space of the vehicle. It is to be appreciated that the confidence scores of the individual reference points may be seen as a measure of whether it belongs to free-space or not (or in some embodiments whether it simply belongs to road or not). These confidence scores may, as stated above, be determined, e.g., through conventional semantic segmentation techniques. However, when the confidence scores of the reference points belonging to a cell is combined into the aggregated confidence score, the aggregated confidence score may be seen as a measure of whether the cell as a collective belongs to free-space or not, since it weighs in all reference points of the cell, which potentially have different confidence scores.

The aggregated confidence score of each cell may be an average of the confidence scores of the reference points within the respective cells. In other words, the aggregated confidence score may be an average confidence score of the confidence scores of the reference points within the cell. The aggregated confidence score may then be indicative of belonging to a free-space if the aggregated confidence score exceeds a threshold value. For example, it may be determined as free-space if the confidence score is above 50%, 70%, or any other threshold value.

In case the confidence scores of belonging to free-space is binary, i.e., being either free-space or non-free-space, the aggregated confidence score of each cell may be set as the confidence score of the most frequent label of free-space or non-free-space among the reference points in the respective cell. In other words, the aggregated confidence score may be indicative of belonging to a free-space if the number of reference points in the cell being classified as free-space is greater than the number of reference points in the cell being classified as non-free-space. More generally, the aggregated confidence score may be indicative of belonging to free-space if a ratio between the number of reference points in the cell being classified as free-space and the number of reference points in the cell being classified as non-free-space is above a threshold. In the above example, the threshold can be seen as being 50%. However, the threshold may have other values as well, both below and above 50%, depending on the specific implementation. For instance, the threshold may be set such that a cell is classified as free-space if at least 70% of the reference points of that cell are classified as free-space. Thus, a higher confidence is required for a cell to be classified as free-space, compared to the example above.

In yet another example, the aggregated confidence score may be indicative of belonging to a non-free-space if at least one, or a number above a certain threshold, of reference point(s) of the cell is classified as non-free-space. Thus, an even stricter rule is applied for determining the free-space.

As explained in the foregoing, when determining free-space in its broadest form, the free-space may comprise both drivable free-space and non-drivable free-space. In such embodiments, the method 100 may further comprise determining whether the cells having aggregated confidence scores indicative of belonging to free-space belong to drivable free-space. This may, e.g., be done by comparing the location of the cells to map data (i.e., map-matching of the cells). In more detail, the map-position of the cells may be derived by determining the cells' geographical position (e.g., GNSS position) based on the vehicle's geographical position (e.g., GNSS position) and the cell's position relative to the vehicle. Furthermore, the position of the cells may be compared to identified traffic regulations, detected lane boundaries or road boundaries, etc.

The resolution or accuracy of the free-space determined by the method 100 described so far depends on the size of the cells in the grid, as well as their shapes. Generally, the size of a cell should be large enough so that a sufficient amount of reference points is assigned thereto, in order to provide an accurate free-space estimate of the cell. At the same time, the cell should be small enough to give a high resolution, i.e., so that a border between free-space and non-free-space can be accurately determined. How the cell size and shape can be adjusted will be further explained below in connection with FIG. 4. In the following, some embodiments of the method 100 in which this can be improved will be described. The following steps will be described for a cell of the plurality of cells. It should be appreciated that the principles apply to the whole grid. In other words, the following steps may be performed for one or more of the cells in the grid. In some embodiments, the following steps are performed for each cell of the grid.

The method 100 may further comprise, for a cell of the plurality of cells, determining S112 a mean position and standard deviation of the reference points in the cell labelled as free-space. Put differently, a mean position and standard deviation of the positions of the reference points having a confidence score which indicates that they belong to free-space may be determined S112. The position herein refers to a 2D position of the reference points within the cell. The method 100 may further comprise determining S114 a mean position and standard deviation of the reference points in the cell labelled as non-free-space. Put differently, a mean position and standard deviation of the positions of the reference points having a confidence score which indicates that they don't belong to free-space may be determined S114. The method 100 may further comprise dividing S116 the cell into a first and a second sub-portion based on the determined mean position and standard deviation of the reference points labelled as free-space, and based on the determined mean position and standard deviation of the reference points labelled as non-free-space. Assigning S118 an aggregated confidence score of the cell may then comprise assigning S122 a first aggregated confidence score of the first sub-portion of the cell based on the reference points belonging to the first sub-portion, and a second aggregated confidence score to the second sub-portion of the cell based on the reference points belonging to the second sub-portion.

The above-described steps of the method 100 will be further explained below by the illustrative example of FIG. 6.

Executable instructions for performing these functions are, optionally, included in a non-transitory computer-readable storage medium or other computer program product configured for execution by one or more processors.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Figure 2:
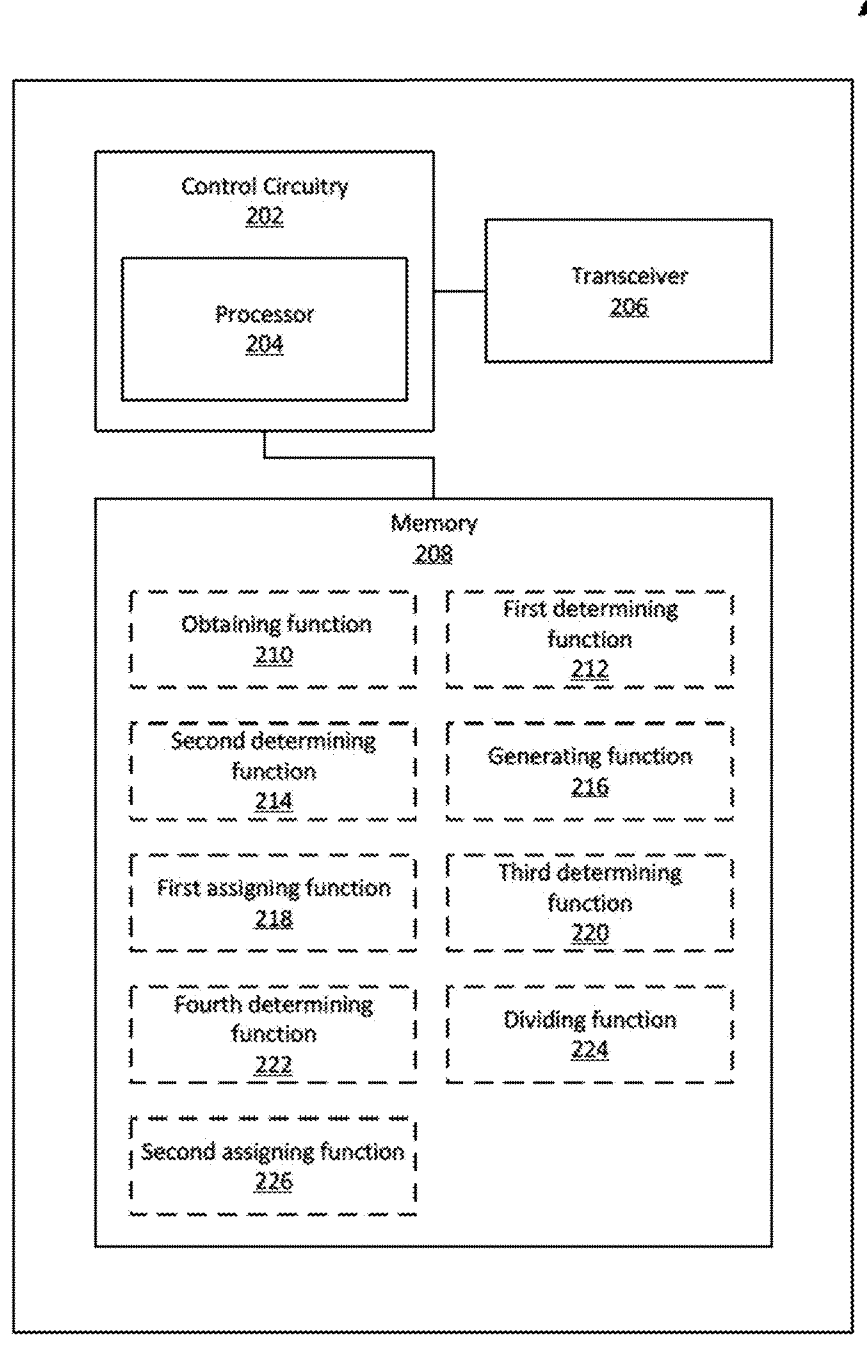
FIG. 2 is a schematic illustration of a device for determining free-space in a surrounding environment of a vehicle equipped with an automated driving system in accordance with some embodiments.

FIG. 2 is a schematic illustration of a device 200 for determining free-space in a surrounding environment of a vehicle equipped with an automated driving system, ADS. In particular, the device is configured to perform the techniques described in the foregoing with reference to FIG. 1. The device 200 may be provided locally in a vehicle, such as in the vehicle 300 described below in connection with FIG. 3. More specifically, the device 200 may be an integrated device of an automated driving system, ADS, of the vehicle. Alternatively, the device 200 may be an external device to the ADS and communicatively connected to the ADS. Alternatively, the device 200 may be provided as an external device to the vehicle, such as a remote server. The remote server may be communicatively connected to the vehicle. As is readily understood by the person skilled in the art, the functions of the device 200 may be distributed over one or more devices. For instance, some of the functions of the herein described device 200 may be implemented by a device in the vehicle, and some of the functions may be implemented by the remote server.

The device 200 comprises control circuitry 202. The control circuitry 202 may physically comprise one single circuitry device. Alternatively, the control circuitry 202 may be distributed over several circuitry devices. As an example, the device 200 may share its control circuitry 202 with other parts of the vehicle, in case it is implemented in the vehicle.

As shown in the example of FIG. 2, the device 200 may further comprise a transceiver 206 and a memory 208. The control circuitry 202 being communicatively connected to the transceiver 206 and the memory 208. The control circuitry 202 may comprise a data bus, and the control circuitry 202 may communicate with the transceiver 206 and/or the memory 208 via the data bus.

The control circuitry 202 may be configured to carry out overall control of functions and operations of the device 200. The control circuitry 202 may include a processor 204, such as a central processing unit (CPU), microcontroller, or microprocessor. The processor 204 may be configured to execute program code stored in the memory 208, in order to carry out functions and operations of the device 200. The control circuitry 202 is configured to perform the steps of the method 100 as described above in connection with FIG. 1. The steps may be implemented in one or more functions stored in the memory 208. The control circuitry 202 may be configured to execute an obtaining function 210, a first determining function 212, a second determining function 214, a generating function 216, a first assigning function 218, a third determining function 220, a fourth determining function 222, a dividing function 224 and/or a second assigning function 226. It should be noted that the various function and operation of the device 200 may be implemented in additional functions than those described herein. In addition, one or more of the above functions may be implemented together in a common function. For example, the first through fourth determining function 212, 214, 220, 222 may be implemented in one or more common determining functions. Similarly, the first and second assigning function 218, 226 may be implemented in a common assigning function.

The transceiver 206 is configured to enable the device 200 to communicate with other devices. The transceiver 206 may both transmit data from and receive data to the device 200. For example, the device 200 may transmit data to or receive data from another vehicle or a remote server. Even though not explicitly illustrated in FIG. 2, the device 200 may comprise user input devices such as one or more of a keyboard, a mouse, and a touchscreen.

The memory 208 may be a non-transitory computer-readable storage medium. The memory 208 may be one or more of a buffer, a flash memory, a hard drive, a removable media, a volatile memory, a non-volatile memory, a random access memory (RAM), or another suitable device. In a typical arrangement, the memory 208 may include a non-volatile memory for long-term data storage and a volatile memory that functions as system memory for the device 200. The memory 208 may exchange data with the circuitry 202 over the data bus. Accompanying control lines and an address bus between the memory 208 and the circuitry 202 also may be present.

Functions and operations of the device 200 may be implemented in the form of executable logic routines (e.g., lines of code, software programs, etc.) that are stored on a non-transitory computer readable recording medium (e.g., the memory 208) of the device 200 and are executed by the circuitry 202 (e.g., using the processor 204). Put differently, when it is stated that the circuitry 202 is configured to execute a specific function, the processor 204 of the circuitry 202 may be configured execute program code portions stored on the memory 208, wherein the stored program code portions correspond to the specific function. Furthermore, the functions and operations of the circuitry 202 may be a stand-alone software application or form a part of a software application that carries out additional tasks related to the circuitry 202. The described functions and operations may be considered a method that the corresponding device is configured to carry out, such as the method 100 discussed above in connection with FIG. 1. Also, while the described functions and operations may be implemented in software, such functionality may as well be carried out via dedicated hardware or firmware, or some combination of one or more of hardware, firmware, and software. In the following, the function and operations of the device 200 is described.

The control circuitry 202 is configured to obtain, from a camera of the vehicle, an image depicting the surrounding environment of the vehicle. This may be performed, e.g., by execution of the obtaining function 210.

The control circuitry 202 is further configured to determine, for each reference point of a plurality of reference points in the image, segmentation data indicative of a confidence score of the reference point belonging to free-space. This may be performed, e.g., by execution of the first determining function 212.

The control circuitry 202 is further configured to determine, for each reference point of the plurality of reference points, depth data indicative of a distance of each reference point relative the camera. This may be performed, e.g., by execution of the second determining function 214.

The control circuitry 202 is further configured to assign each reference point of the plurality of reference points to a cell of a plurality of cells in a grid, based on the depth data associated with each reference point of the plurality of reference points. This may be performed, e.g., by execution of the first assigning function 218. The grid corresponds to an estimated ground plane of the surrounding environment.

The control circuitry 202 is further configured to assign, to each cell of the grid, an aggregated confidence score, based on the segmentation data associated with each reference point of the respective cell. Thereby a free-space in the surrounding environment of the vehicle is determined as the cells having aggregated confidence scores indicative of belonging to free-space. This may be performed, e.g., by execution of the second assigning function 226.

The control circuitry 202 may be further configured to generate a 3D point cloud representation by backward projection of each reference point of the plurality of reference points based on the associated depth data. This may be performed, e.g., by execution of the generating function 216. Assigning each reference point of the plurality of reference points to a cell may then comprise projecting the reference points of the 3D point cloud representation onto the grid.

The control circuitry 202 may be further configured to, for a cell of the plurality of cells, determine a mean position and standard deviation of the reference points in the cell labelled as free-space. This may be performed, e.g., by execution of the third determining function 220.

The control circuitry 202 may be further configured to determine a mean position and standard deviation of the reference points in the cell labelled as non-free-space. This may be performed, e.g., by execution of the fourth determining function 222.

The control circuitry 202 may be further configured to divide the cell into a first and a second sub-portion based on the determined mean positions and standard deviations. This may be performed, e.g., by execution of the dividing function 224.

Assigning the aggregated confidence score of the cell may comprise assigning a first aggregated confidence score of the first sub-portion of the cell based on the reference points belonging to the first sub-portion, and a second aggregated confidence score to the second sub-portion of the cell based on the reference points belonging to the second sub-portion.

It should be noted that the principles, features, aspects, and advantages of the method 100 as described above in connection with FIG. 1, are applicable also to the device 200 as described herein. In order to avoid undue repetition, reference is made to the above.

Figure 3:
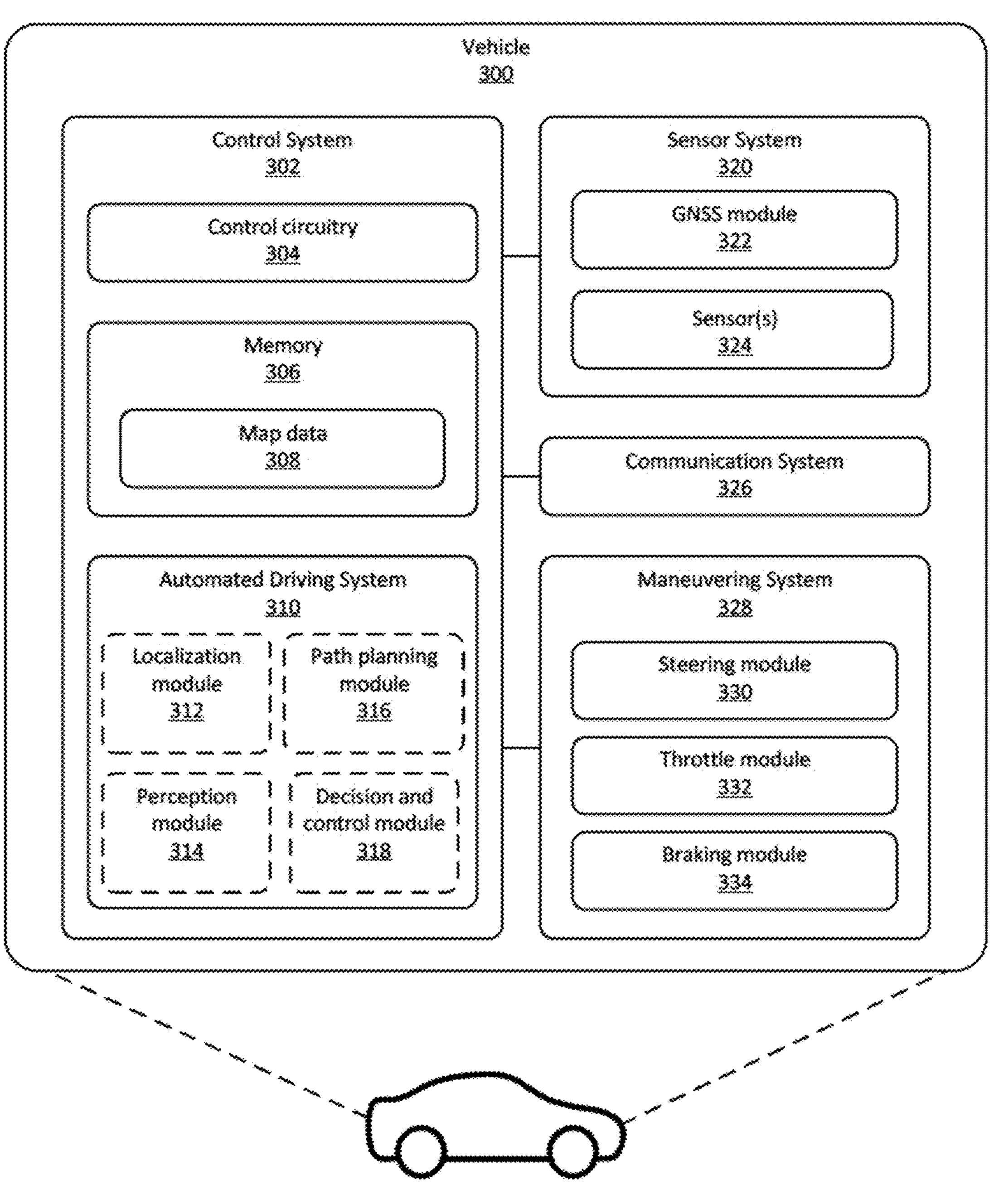
FIG. 3 is a schematic illustration of a vehicle in accordance with some embodiments.

FIG. 3 is a schematic illustration of an example of a vehicle 300 in accordance with some embodiments. The vehicle 300 is equipped with an Automated Driving system (ADS) 310. As used herein, a "vehicle" is any form of motorized transport. For example, the vehicle 300 may be any road vehicle such as a car (as illustrated herein), a motorcycle, a (cargo) truck, a bus, a smart bicycle, etc.

The vehicle 300 comprises a number of elements which can be commonly found in autonomous or semi-autonomous vehicles. It will be understood that the vehicle 300 can have any combination of the various elements shown in FIG. 3. Moreover, the vehicle 300 may comprise further elements than those shown in FIG. 3. While the various elements are herein shown as located inside the vehicle 300, one or more of the elements can be located externally to the vehicle 300. Further, even though the various elements are herein depicted in a certain arrangement, the various elements may also be implemented in different arrangements, as readily understood by the skilled person. It should be further noted that the various elements may be communicatively connected to each other in any suitable way. The vehicle 300 of FIG. 3 should be seen merely as an illustrative example, as the elements of the vehicle 300 can be realized in several different ways.

The vehicle 300 comprises a control system 302. The control system 302 is configured to carry out overall control of functions and operations of the vehicle 300. The control system 302 comprises control circuitry 304 and a memory 306. The control circuitry 302 may physically comprise one single circuitry device. Alternatively, the control circuitry 302 may be distributed over several circuitry devices. As an example, the control system 302 may share its control circuitry 304 with other parts of the vehicle. The control circuitry 302 may comprise one or more processors, such as a central processing unit (CPU), microcontroller, or microprocessor. The one or more processors may be configured to execute program code stored in the memory 306, in order to carry out functions and operations of the vehicle 300. The processor(s) may be or include any number of hardware components for conducting data or signal processing or for executing computer code stored in the memory 306. In some embodiments, the control circuitry 304, or some functions thereof, may be implemented on one or more so-called system-on-a-chips (SoC). As an example, the ADS 310 may be implemented on a SoC. The memory 306 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 306 may include database components, object code components, script components, or any other type of information structure for supporting the various activities of the present description.

In the illustrated example, the memory 306 further stores map data 308. The map data 308 may for instance be used by the ADS 310 of the vehicle 300 in order to perform autonomous functions of the vehicle 300. The map data 308 may comprise high-definition (HD) map data. It is contemplated that the memory 308, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 304 may be distributed e.g. such that one or more processors of the control circuitry 304 is provided as integral elements of the ADS 310 or any other system of the vehicle 300. In other words, according to an exemplary embodiment, any distributed or local control circuitry device may be utilized in the realization of the present inventive concept.

The vehicle 300 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 300. The sensor system 320 may further comprise one or more sensors 324. The one or more sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via dedicated sensor control circuitry in the vehicle 300.

The vehicle 300 further comprises a communication system 326. The communication system 326 is configured to communicate with external units, such as other vehicles (i.e., via vehicle-to-vehicle (V2V) communication protocols), remote servers (e.g., cloud servers, as explained further below in connection with FIG. 5), databases or other external devices, i.e., vehicle-to-infrastructure (V2I) or vehicle-to-everything (V2X) communication protocols. The communication system 326 may communicate using one or more communication technologies. The communication system 326 may comprise one or more antennas. Cellular communication technologies may be used for long range communication such as to remote servers or cloud computing systems. In addition, if the cellular communication technology used has low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area Network (WLAN), e.g., IEEE 802.11 based solutions, for communicating with other vehicles in the vicinity of the vehicle 300 or with local infrastructure elements. ETSI is working on cellular standards for vehicle communication and for instance 5G is considered as a suitable solution due to the low latency and efficient handling of high bandwidths and communication channels.

The communication system 326 may further provide the possibility to send output to a remote location (e.g., remote operator or control center) by means of the one or more antennas. Moreover, the communication system 326 may be further configured to allow the various elements of the vehicle 300 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth®, or similar mid/short range technologies.

The vehicle 300 further comprises a maneuvering system 320. The maneuvering system 328 is configured to control the maneuvering of the vehicle 300. The maneuvering system 328 comprises a steering module 330 configured to control the heading of the vehicle 300. The maneuvering system 328 further comprises a throttle module 332 configured to control actuation of the throttle of the vehicle 300. The maneuvering system 328 further comprises a braking module 334 configured to control actuation of the brakes of the vehicle 300. The various modules of the steering system 328 may receive manual input from a driver of the vehicle 300 (i.e., from a steering wheel, a gas pedal and a brake pedal respectively). However, the maneuvering system 328 may be communicatively connected to the ADS 310 of the vehicle, to receive instructions on how the various modules should act. Thus, the ADS 310 can control the maneuvering of the vehicle 300.

As stated above, the vehicle 300 comprises an ADS 310. The ADS 310 may be part of the control system 302 of the vehicle. The ADS 310 is configured to carry out the functions and operations of the autonomous functions of the vehicle 300. The ADS 310 can comprise a number of modules, where each module is tasked with different functions of the ADS 310.

The ADS 310 may comprise a localization module 312 or localization block/system. The localization module 312 is configured to determine and/or monitor a geographical position and heading of the vehicle 300, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system. The perception module 314 may refer to any commonly known module and/or functionality, e.g., comprised in one or more electronic control modules and/or nodes of the vehicle 300, adapted and/or configured to interpret sensory data—relevant for driving of the vehicle 300—to identify, e.g., obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data, e.g., from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

The ADS may further comprise a path planning module 316. The path planning module 316 is configured to determine a planned path of the vehicle 300 based on a perception and location of the vehicle as determined by the perception module 314 and the localization module 312 respectively. A planned path determined by the path planning module 316 may be sent to the maneuvering system 328 for execution.

The ADS may further comprise a decision and control module 318. The decision and control module 318 is configured to perform the control and make decisions of the ADS 310. For example, the decision and control module 318 may decide on whether the planned path determined by the path-planning module 316 should be executed or not.

The vehicle 300 is configured to perform the functions of the method 100 as described above in connection with FIG. 1. This may be achieved by the vehicle 300 comprising the device 200 for determining free-space as described above in connection with FIG. 2. The device 300 may be provided as an integral part of, e.g., the perception module 314 or path planning module 316. Alternatively, the device 200 may be distributed over several modules or elements of the vehicle 300, or as a separate module, depending on a specific realization.

It should be understood that parts of the described solution may be implemented either in the vehicle 300, in a system located external the vehicle, or in a combination of internal and external the vehicle; for instance, in a server in communication with the vehicle, a so-called cloud solution. The different features and steps of the embodiments may be combined in other combinations than those described. Further, the elements of the vehicle 300 (i.e., the systems and modules) may be implemented in different combinations than those described herein.

Figure 4:
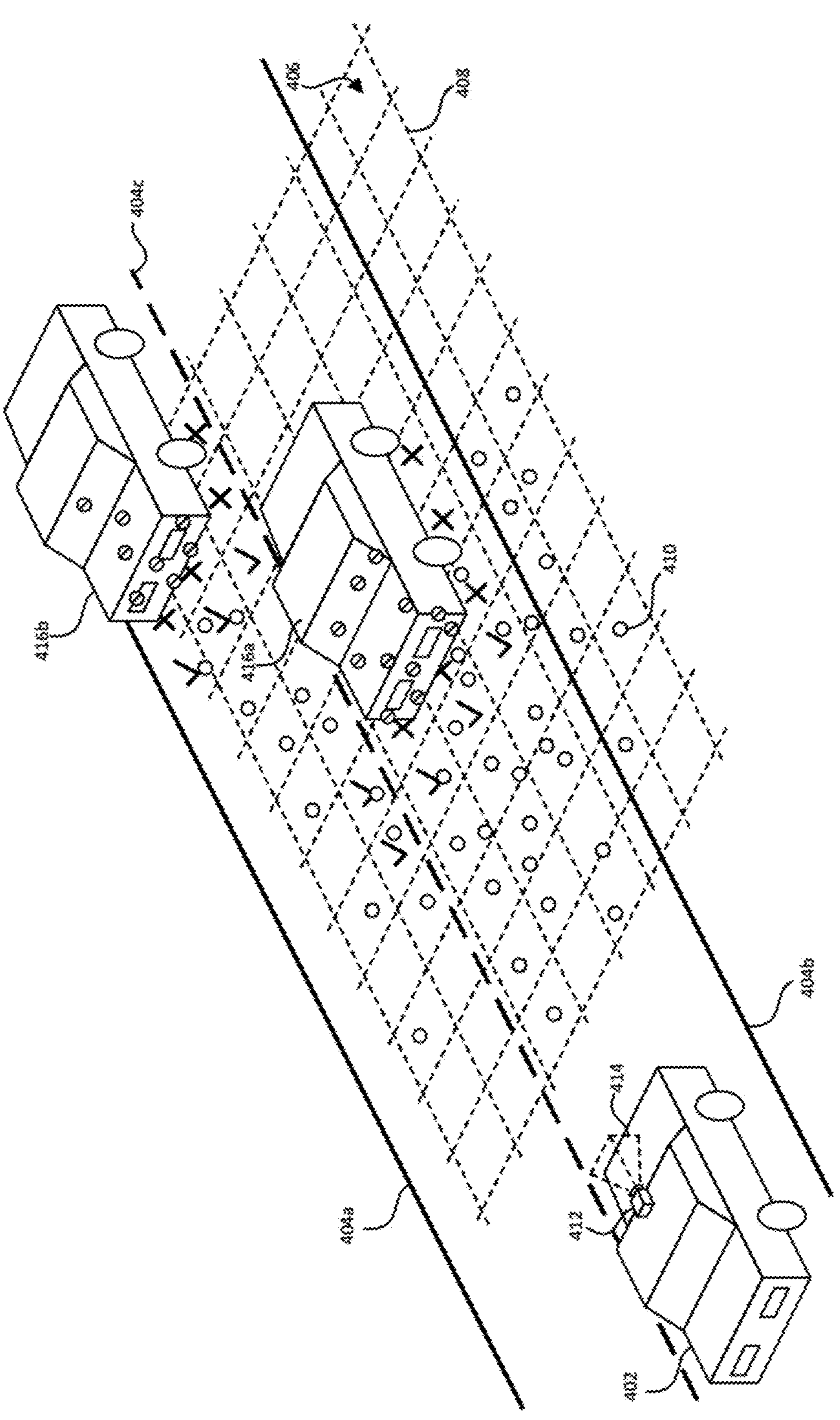
FIG. 4 schematically illustrates, by way of example, a surrounding environment of a vehicle.

FIG. 4 schematically illustrates, by way of example, a surrounding environment of a vehicle 402 in perspective view. More specifically, the vehicle 402 is a vehicle 300 as described above in connection with FIG. 3.

The vehicle 402 comprises a camera 412. The camera, in the present example, has a field of view 414 in a forward direction of the vehicle. However, it should be appreciated that the principles of the present disclosure can be applied to any direction of the vehicle. For example, rear- or side-facing cameras may also be used. This allows for free-space estimation in any space around the vehicle.

In the illustrated example, the camera 412 is provided externally, on a roof of the vehicle 402. It should however be appreciated that the camera 412 may be provided integrally of the vehicle 402 at any suitable position. Moreover, the vehicle 402 may comprise additional cameras, as well as other types of sensors, as explained above e.g. in connection with FIG. 3.

The camera 412 is configured to capture images of the surrounding environment of the vehicle 402. More specifically, the camera 412 is configured to capture an image of the surrounding environment in front of the vehicle 402. In the present example, the vehicle 402 is travelling along a dual carriageway defined by a first and second road boundary 404*a*, 404*b*, and a lane divider 404*c*.

In the surrounding environment in front of the vehicle 402, a first and second vehicle 416*a*, 416*b* is present. The first and second vehicle 416*a*, 416*b* herein represents possible obstacles that limits the free-space of the vehicle 402. It should be noted that the obstacles might be any type of stationary or moving object, such as other vehicles, cyclists, pedestrians, animals, road construction signs, traffic cones, buildings etc.

As explained in the forgoing, the presently disclosed technology involves assigning reference points of an image depicting the surrounding environment to a grid 408 comprising a plurality of cells 406. The assigning of the reference points to the cells 406 of the grid is based on depth data associated with each reference point. In other words, a reference point is assigned to the cell that has the same distance to the camera as the reference point. It should be noted that the assigning of the reference points to the cells also reflects the position of the reference points in a lateral direction, as apparent in FIG. 4. The depth data of each reference point may thus further comprise information about the lateral position of the reference point. In other words, a 3D position of a reference point can be used to assign the reference point to a cell of the grid.

The grid 408 corresponds to an estimated ground plane of the depicted surrounding environment. A part of such a grid 408 is herein shown in dashed lines for illustrative purposes. As one way of seeing it, the grid 408 divides the ground plane into a number of neighboring cells 406. It is to be noted that the grid 408 may span over a larger or smaller area than the illustrated portion of the grid 408.

For illustrative purposes, the cells 406 of the grid are herein depicted as evenly sized rectangles. It should however be appreciated that the size and shape of the cells 406 are not limited to those depicted herein. For example, the cells 406 may have any polygonal shape. Further, the present example illustrates that the grid 408 may have a uniform cell size. However, in some embodiments, the grid 408 may have a varying cell size. As an example, the cell size may increase with a distance from the vehicle 402. In other words, the grid 408 may have larger sized cells 406 further away from the camera 412, and smaller sized cells 406 closer to the camera. A smaller cell size may increase accuracy and resolution of the estimated free-space, but it also leads to a greater number of cells, and thus increased computational resource requirements. Having smaller sized cells close to the vehicle, and larger sized cells farther away from the vehicle 402 may be advantageous in that it provides for a relatively high accuracy/resolution in the close vicinity of the vehicle 402, which is of the greatest importance when determining a route of the vehicle 402. At the same time, the computational resource requirement can be reduced by allowing a lower accuracy/resolution in the farther distance, which is of less relevance.

In another example, the grid 408 may be a so-called tree-based grid, or hierarchical grid. In such grids, a smaller cell size is provided in areas with a relatively high density of reference points, and at the same time a larger cell size in areas with a relatively low density of reference points. The tree-based or hierarchical grid may be provided dynamically within a limit of the cell sizes of the grid. Alternatively, the structure of the tree could be set statically to enable parallel computing on a GPU easier.

In yet another example, the grid 408 may have a smaller cell size in areas closer to any objects in the image, and larger cell size in areas further away from any objects. For example, in the area around the first and second vehicle 416*a*, 416*b*, a smaller cell size may be used to accurately capture the transition from free-space to occupied space. Put differently, a smaller cell size may be used in areas around edges of objects (such as at the back of a truck), while larger cell sizes may be used in less critical areas (e.g., where no objects are present).

Further illustrated in FIG. 4 is a plurality of reference points 410 superimposed in the scene. Each of the reference points 410 are associated with segmentation data indicative of a confidence score of the reference points belonging to free-space. In the present example, the confidence score is represented by a binary label of either free-space (circle with no line) or non-free-space (circle with line). However, as described above, the confidence score may be defined in other ways as well. For instance, by a continuous probability value. The confidence score of the reference points may also be defined as road or non-road.

By their position in the 3D space, which can be given by depth data associated with the reference points 410, each reference point 410 are assigned to a cell 406 in the grid 408. In some embodiments, the reference points 410 are projected into a 3D space, which also comprises the grid 408, to form a 3D point cloud. The reference points 410 may then be projected down onto the grid 408 along a normal direction of the grid 408.

As explained in the foregoing, each cell 406 of the grid 408 is assigned an aggregated confidence score. The aggregated confidence score is based on the segmentation data associated with the reference points assigned to the respective cells. The free-space may then be determined as the cell that has an aggregated confidence score that indicates that the cell belongs to free-space, i.e. that the cell corresponds to unoccupied road. To exemplify this, some of the cells that do not belong to free-space are indicated by a cross. These cells are in this example occupied by the first and second vehicle 416*a*, 416*b*. Some of the cells belonging to free-space are marked with check marks. In this case, these cells correspond to unoccupied road. It should be appreciated that even though the free-space estimation is only shown for some of the cells 406 of the grid 408, it can be performed for all cells of the grid 408. Depending on the realization, additional requirements may be checked for determining the free-space, such as traffic rules or safety requirements. For example, cells which are outside the road may be classified as not belonging to free-space, such as the cells which are outside the first and second road boundary 404*a*, 404*b*.

As is readily understood by the person skilled in the art, the present inventive concept is in no way limited by the illustrative example of FIG. 4. For example, the free-space estimation may be performed in any driving scenario, such as one-way streets, single carriageways with oncoming traffic, multi carriageways, parking lots, intersections, roundabouts, etc. Further, the sizes and shapes of the illustrated elements may not be representative of a real-world scenario, but rather be seen as a non-limiting example for illustrative purposes. Furthermore, the number of reference points 410, as well as their position within the 3D space are only to be seen as a non-limiting example for illustrative purposes.

Figure 5A:
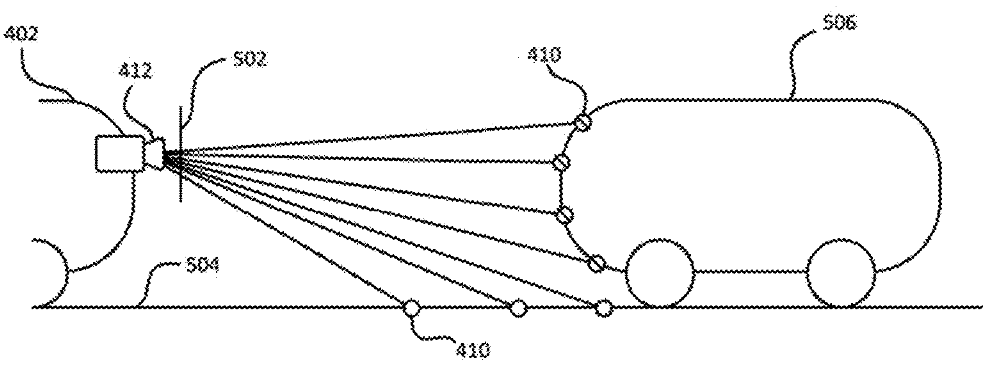
FIGS. 5A to 5C schematically illustrate, by way of example, a surrounding environment of a vehicle in side-view.
Figure 5B:
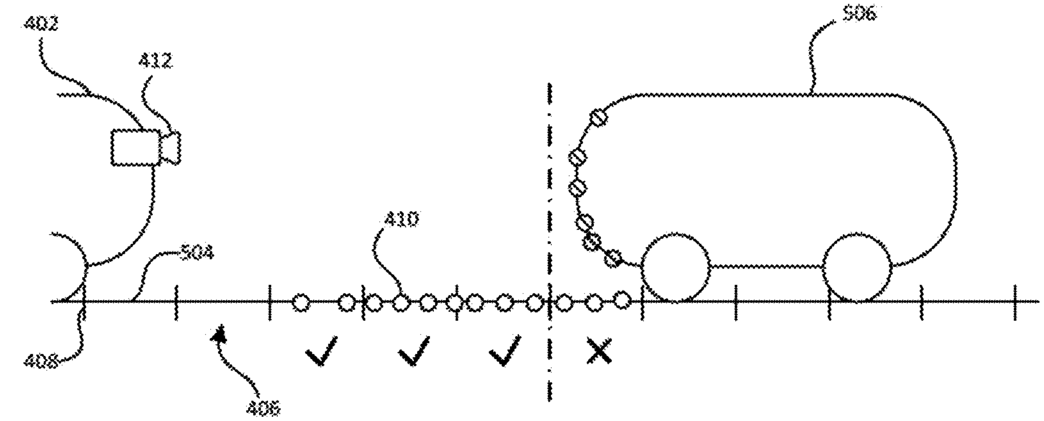
Figure 5C:
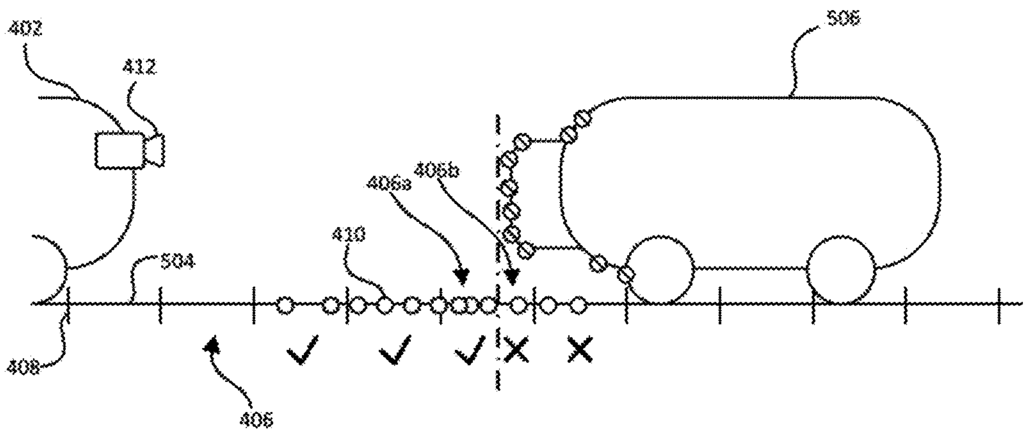

FIGS. 5A to 5C schematically illustrate, by way of example, a surrounding environment of a vehicle 402 in side-view. More specifically, FIGS. 5A to 5C illustrate a scene where a further vehicle 506 is in front of the vehicle 402 (also referred to as the ego-vehicle). The ego-vehicle 402 comprises a forward facing camera 412 for capturing images depicting the surrounding environment.

Looking at FIG. 5A, an illustration of how a 3D point cloud can be generated is shown. A plurality of reference points 410 of an image is backwards projected from an image plane 502 to a 3D representation of the depicted scene, utilizing depth data associated with each reference point 410. The depth data comprises information about a distance from the camera 412 to an object depicted in the image. Each reference point 410 is further associated with segmentation data. As in the case of FIG. 4, the segmentation data is herein illustrated as either circles with a line, representing a reference point classified as non-free-space, or with circles without a line, representing a reference point classified as free-space.

FIG. 5A (as well as FIGS. 5B and 5C) highlights a problem of an approach of using only segmentation data. If the free-space would be determined as all areas depicting road, there is a risk that parts of the road that appears to be unoccupied in the image are actually located under an object. For example, the rightmost reference point classified as road in the illustrated example lies beneath the further vehicle 506. With the known prior art solutions, there is thus a risk of the area around this reference point is mistakenly determined as free-space. The presently disclosed technology can mitigate this problem as has been explained above. This will further be illustrated in the following, in connection with FIGS. 5B and 5C.

FIG. 5B further illustrates a grid 408 (herein represented by the vertical solid lines) comprising a plurality of cells 406 (i.e., the area between each consecutive pair of vertical line). The grid 408 corresponds to an estimated ground plane 504 of the image. Each reference point 410 of the plurality of reference points are assigned to a cell 406 of the grid 408. As mentioned above, this may be done by projecting the reference points 410 down to the grid 408 (or ground plane 504). The cells 406 are then assigned an aggregated confidence score based on the semantic data (or confidence score) of the reference points assigned to the respective cells. Based on the aggregated confidence score, it can be determined whether a cell belongs to free-space (herein denoted by check mark) or not (herein denoted by cross).

A vertical line in dash-dot pattern illustrates a border between free-space and non-free-space of the present example. The cells to the left of the dash-dot line comprise only reference points classified as free-space, and thus have been determined as free-space. The cell to the right of the dash-dot line comprises a greater number of reference points classified as non-free-space, than free-space. The aggregated confidence score may thus indicate that the cell does not form part of the free-space, despite some reference points being classified as free-space. This way, the free-space estimation can be made more accurately, since the free-space estimation is done based on both the segmentation data (i.e. what the reference points are classified as) and the depth data (i.e. how the reference points relate to each other in the 3D space).

The principles of the disclosed technology also make it more robust against erroneous classification of reference points. Even if a reference point belonging to free-space are mistakenly classified as non-free-space, the aggregated confidence score of the cell in which said reference point is located may still be correctly classified as free-space, since all reference points within the cell is considered in the free-space estimation.

FIG. 5C illustrates a slightly different scenario compared to FIG. 5B. The further vehicle 506 in FIG. 5C has a cargo sticking out from the back of the vehicle, such that the border between free-space and non-free-space, illustrated by the vertical line in dash-dot pattern, lies somewhere near a center of a cell 406. Such a scenario may be challenging because the cell in question may comprise a similar number of free-space and non-free-space reference points, making it hard to determine whether the cell belongs to free-space or not. Further, if the cell would be determined as non-free-space, the determined free-space in the surrounding environment of the vehicle 402 will actually be smaller than it has to be, thereby unnecessary limiting the possibilities of the vehicle 402. If instead the cell would be determined as free-space, the determined free-space is actually larger than it should be, thereby causing an increase safety risk.

One way of mitigating these challenges/problems may be to use a different or varying cell size, as explained in the foregoing in connection with FIG. 4. For example, a smaller cell size may be used over the entire grid 408, or in an area around the further vehicle 506.

Another example of mitigating these challenges/problems may be to divide the cell into a first and second sub-portion 406*a*, 406*b* (separated at the border line), and assign different aggregated confidence scores to the different sub-portions 406*a*, 406*b*, as described above in connection with FIG. 1. This will be further illustrated by the example of FIG. 6.

Figure 6:
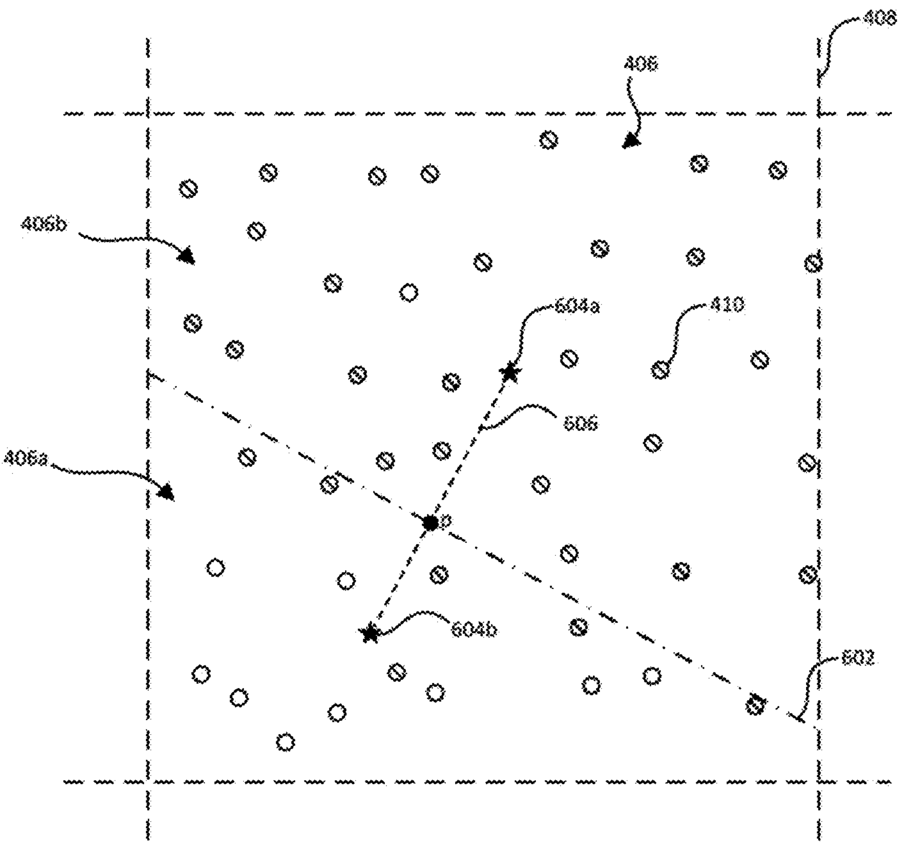
FIG. 6 schematically illustrates, by way of example, a cell of a grid in top-view.

FIG. 6 schematically illustrates, by way of example, a cell 406 of the grid 408 in top-view. The cell 406 comprises a plurality of reference points assigned to the cell. As in FIGS. 4, and 5A to 5C, the reference points are classified as either free-space or non-free-space, which is illustrated by the different circles. Disregarding some outliers, which may be present e.g. due to misclassification or noise in the image, the border between free-space and non-free-space appears to be around the dash-dot line, denoted 602 in FIG. 6. Instead of determining that the boundary between free-space and non-free-space is at a boundary of the cell, a more exact boundary can be determined by the principles described above in connection with FIG. 1 that involves dividing the cell into a first and second sub-portion. This will be further explained in the following.

According to these embodiments, a mean position and standard deviation (of the positions) of the reference points labelled as non-free-space is determined. The mean position of the non-free-space reference points are herein represented by a star shape denoted 604*a*. The mean position is an average position of the non-free-space reference points within the cell 406. The standard deviation is to be seen as a measure of how much the actual position of the respective reference points deviate from the determined mean position.

Similarly, a mean position and standard deviation of the reference points labelled as free-space is determined. The mean position of the reference points being classified as free-space is herein represented by a star shape denoted 604*b*.

The cell may then be divided into a first and second sub-portion 406*a*, 406*b* based on the determined mean positions 604*a*, 604*b* and the respective standard deviation. Under the assumption that the border between free-space and non-free-space can be approximated by a straight line within the cell 406, the dividing line (or border line) 602 can be determined as follows. First, a line (herein denoted by 606) can be drawn between the mean position 604*a* of the non-free-space reference points, and the mean position 604*b* of the free-space reference points. The dividing line 602 can then be drawn as a line perpendicular to the line 606 at a determined position p, between the two mean positions 604*a*, 604*b*. The position p can be determined based on the standard deviation of the non-free-space reference points and the standard deviation of the free-space reference points. Put differently, the position p can be determined by linear interpolation between the two mean positions 604*a*, 604*b*, with the standard deviations as interpolation weights.

Upon having divided the cell 406 into the first and second sub-portion 406*a*, 406*b* (as defined by the dividing line 602), a first aggregated confidence score may be assigned to the first sub-portion 406*a* and a second aggregated confidence score may be assigned to the second sub-portion 406*b*. The first aggregated confidence score is then based on the reference points belonging to the first sub-portion 406*a*. Correspondingly, the second aggregated confidence score is then based on the reference points belonging to the second sub-portion 406*b*.

The above described way of dividing the cell 406 is merely to be seen as an example. Other solutions are applicable as well, some of which include support vector machines, and neural networks trained to find a probable boundary between the free-space and non-free-space.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

It should be noted that any reference signs do not limit the scope of the claims, that the invention may be at least in part implemented by means of both hardware and software, and that the same item of hardware may represent several "means" or "units".

The invention claimed is:

1. A computer-implemented method for determining free-space in a surrounding environment of a vehicle equipped with an automated driving system, ADS, the method comprising:

obtaining, from a camera of the vehicle, an image depicting the surrounding environment of the vehicle;

determining, for each reference point of a plurality of reference points in the image, segmentation data indicative of a confidence score of the reference point belonging to free-space;

determining, for each reference point of the plurality of reference points, depth data indicative of a distance of each reference point relative the camera;

assigning each reference point of the plurality of reference points to a cell of a plurality of cells in a grid, based on the depth data associated with each reference point of the plurality of reference points, wherein the grid corresponds to an estimated ground plane of the surrounding environment;

assigning, to each cell of the grid, an aggregated confidence score, based on the segmentation data associated with each reference point of the respective cell, thereby determining a free-space in the surrounding environment of the vehicle as the cells having aggregated confidence scores indicative of belonging to free-space, wherein the confidence score of the reference points is a label of either free-space or non-free-space, and wherein the method further comprises, for a cell of the plurality of cells:

determining a mean position and standard deviation of the reference points in the cell labelled as free-space;

determining a mean position and standard deviation of the reference points in the cell labelled as non-free-space;

dividing the cell into a first and a second sub-portion based on the determined mean positions and standard deviations; and wherein assigning an aggregated confidence score of the cell comprises assigning a first aggregated confidence score of the first sub-portion of the cell based on the reference points belonging to the first sub-portion, and a second aggregated confidence score to the second sub-portion of the cell based on the reference points belonging to the second sub-portion; and controlling maneuvering of the vehicle based on the determined free-space.

2. The method according to claim 1, further comprising generating a 3D point cloud representation by backward projection of each reference point of the plurality of reference points based on the associated depth data; and wherein assigning each reference point of the plurality of reference points to a cell comprises projecting the reference points of the 3D point cloud representation onto the grid.

3. The method according to claim 1, wherein the aggregated confidence score of each cell is an average of the confidence scores of the reference points of the respective cells.

4. The method according to claim 1, wherein the aggregated confidence score of each cell is set as the confidence score of the most frequent label of free-space or non-free-space among the reference points in the respective cell.

5. The method according to claim 1, wherein the grid has a uniform cell size.

6. The method according to claim 1, wherein the grid has a varying cell size.

7. The method according to claim 6, wherein the cell size increases with a distance from the vehicle.

8. The method according to claim 1, wherein the segmentation data is determined by inputting the image to a machine learning model trained to semantically segment images.

9. The method according to claim 1, wherein the depth data is determined by inputting the image to a machine learning model trained to determine a depth estimate of images.

10. A non-transitory computer readable storage medium storing computer program instructions which, when executed by a computing device, causes the computing device to carry out the method according to claim 1.

11. A device for determining free-space in a surrounding environment of a vehicle equipped with an automated driving system, ADS, the device comprising control circuitry configured to:

obtain, from a camera of the vehicle, an image depicting the surrounding environment of the vehicle;

determine, for each reference point of a plurality of reference points in the image, segmentation data indicative of a confidence score of the reference point belonging to free-space;

determine, for each reference point of the plurality of reference points, depth data indicative of a distance of each reference point relative the camera;

assign each reference point of the plurality of reference points to a cell of a plurality of cells in a grid, based on the depth data associated with each reference point of the plurality of reference points, wherein the grid corresponds to an estimated ground plane of the surrounding environment;

assign, to each cell of the grid, an aggregated confidence score, based on the segmentation data associated with each reference point of the respective cell, thereby determining a free-space in the surrounding environment of the vehicle as the cells having aggregated confidence scores indicative of belonging to free-space, wherein the confidence score of the reference points is a label of either free-space or non-free-space, and wherein the control circuitry is further configured to, for a cell of the plurality of cells:

determine a mean position and standard deviation of the reference points in the cell labelled as free-space;

determine a mean position and standard deviation of the reference points in the cell labelled as non-free-space; and divide the cell into a first and a second sub-portion based on the determined mean positions and standard deviations; and wherein assigning an aggregated confidence score of the cell comprises assigning a first aggregated confidence score of the first sub-portion of the cell based on the reference points belonging to the first sub-portion, and a second aggregated confidence score to the second sub-portion of the cell based on the reference points belonging to the second sub-portion; and control maneuvering of the vehicle based on the determined free-space.

12. A vehicle comprising:

at least one camera, and a device for determining free-space in a surrounding environment of the vehicle, according to claim 11.

* * * * *